Dec. 17, 1968   W. B. CONRAD ET AL   3,416,389

MOTION-TRANSMITTING REMOTE CONTROL ASSEMBLY

Filed May 2, 1966

INVENTORS
Winthrop B. Conrad, &
August E. Tschanz

Barnard McGlynn & Lising
ATTORNEYS

United States Patent Office 3,416,389
Patented Dec. 17, 1968

3,416,389
MOTION-TRANSMITTING REMOTE
CONTROL ASSEMBLY
Winthrop B. Conrad, Franklin, and August E. Tschanz, Birmingham, Mich., assignors to Teleflex Incorporated, North Wales, Pa., a corporation of Delaware
Filed May 2, 1966, Ser. No. 546,770
17 Claims. (Cl. 74—502)

ABSTRACT OF THE DISCLOSURE

A motion transmitting remote control assembly including a flexible conduit and an end fitting secured thereto with a flexible motion transmitting core element movably supported within the conduit and extending through the fitting. The core element has a deformed portion at the end extending from the fitting and a terminal means of organic polymeric material is disposed about the core element and in mechanical interlocking engagement with the deformed portion thereof. The terminal means includes an elongated section slidably supported in a bore in the fitting and a knob section and the elongated section is flexible so as to be bendable along the length thereof.

---

Remote control assemblies of the type to which the instant invention pertains usually include a flexible conduit with a fitting of organic polymeric material molded about the end of the conduit and a wire-like motion-transmitting core element slidably disposed in the conduit. The wire-like motion-transmitting core element is flexible and is easily permanently bent; therefore, a metal slider member or bar is normally swaged to the wire-like core element at one end and is adapted to receive a knob at the other end and is slidably disposed in the bore in the fitting.

Such remote control assemblies are frequently utilized in vehicles such as automobiles to control remotely positioned components from the instrument panel of the automobile. That is to say, such remote control assemblies are usually attached to the automobile so that the fitting is connected to the instrument panel so that the knob may be manually grasped to move the motion-transmitting core element. In such environments, the knob is frequently moved so that the metal bar extends in a cantilevered fashion from the bore in the fitting. Since the metal bar is rigid, a hazardous situation is presented when the bar is positioned to extend from the fitting because passengers in the automobile may be thrown against the extending bar in a direction which would bend the bar if it were flexible, but, since the bar is inflexible, it causes serious injury to the passenger. In addition, the metal bar which is in sliding engagement with the bore in the fitting does not provide the frictional sliding characteristics during the sliding contact with the bore of the fittings which are desired in most environments. Furthermore, the relative cost of remote control assemblies utilizing such a metal bar is high because of the cost of the metal to make the bar, because of the cost involved in swaging the metal bar to the end of the wire-like core element and because of the cost involved in securing a knob to the other end of the metal bar.

Accordingly, it is an object and feature of this invention to provide a motion-transmitting remote control assembly of the foregoing type wherein the terminal member which is slidably disposed in the bore of the fitting is formed by molding organic polymeric material about the end of the core element which has a deformed portion for mechanical interlocking engagement with the organic polymeric material thereby providing a terminal means which: has the desired frictional characteristics when in sliding engagement with the bore of the fitting, which strengthens the wire-like core element sufficiently to prevent the core element from being permanently bent yet remains flexible for safety, and which is less expensive to manufacture than the prior art assemblies.

In general, these and other objects and features of this invention may be attained in a preferred embodiment including a flexible conduit with an end fitting disposed on one end and which fitting has a bore therethrough aligned with the bore in the conduit. A motion-transmitting core element is movably supported in the conduit and the fitting and has one end extending from the bore in the fitting. The other end of the motion-transmitting core element is adapted for attachment to a component to be controlled. The core element has a deformed portion adjacent the end which extends from the bore of the fitting and a terminal means of organic polymeric material is disposed about the core element in mechanical interlocking engagement with the deformed portion. The terminal means includes an elongated section which is slidably disposed in the bore of the fitting and a knob section. In one form of the invention, the knob section and the elongated section are molded integrally of the same organic polymeric material, and, in another form of the invention, the knob and elongated section are formed independently of one another and are in mechanical interlocking engagement with one another. The latter form of the invention may be manufactured by first molding the elongated section of organic polymeric material about the core element and thereafter molding a knob of organic polymeric material about the deformed portion of the core element and the end of the elongated section so that the knob is in mechanical interlocking engagement with the core element and in mechanical interlocking engagement with the elongated section. Alternatively, a knob having a pocket therein is disposed in a cavity in a mold and the core element is disposed in the cavity with the deformed end thereof in the pocket of the knob and organic polymeric material is injected into the cavity to form the elongated section about the core element and about the deformed portion in the pocket of the knob so that the elongated section is in mechanical interlocking engagement with the core element and in mechanical interlocking engagement with the knob. Preferably, the fitting is of an organic polymeric material and the bore in the fitting is polygonal in cross section with a plurality of sides intersecting at a plurality of corners and the elongated section has a plurality of surfaces extending therealong, each of which slidably engages one of the sides of the bore in the fitting. The surfaces along the elongated section, however, are joined by segments which are in turn spaced from the corners in the bore of the fitting. The fitting includes a pair of membranes which are formed integrally therewith and project into the bore of the fitting for frictionally engaging two of the surfaces of the elongated section to provide the desired amount of frictional resistance to the movement of the elongated section within the bore of the fitting.

Other objects and attendant advantages of this invention will be readily appreciated as the same becomes better understood by reference to the following detailed description when considered in connection with the accompanying drawings wherein.

Figure 6:
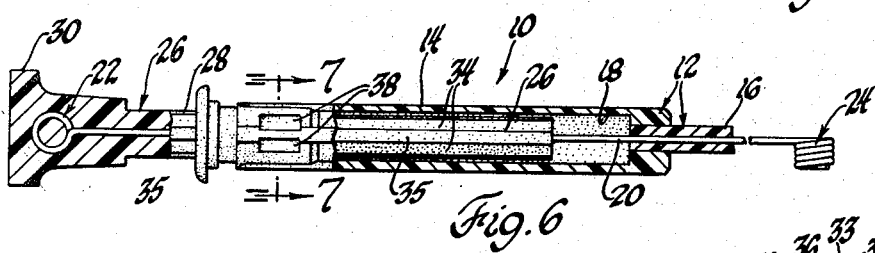
FIGURE 6 is a cross-sectional side view of a preferred embodiment of the remote control assembly of the instant invention.

Referring now to the drawings, wherein like numerals indicate like or corresponding parts throughout the several views, a preferred embodiment of a motion-transmitting remote control assembly of the instant invention is generally shown at 10 in FIGURE 6. The remote control assembly includes a guide, generally indicated at 12, which includes a fitting 14 secured to a flexible conduit 16. The fitting 14 has a bore 18 extending therethrough and a motion-transmitting core element 20 is movably supported for sliding movement within the conduit 16 and the fitting 14. The core element 20 has a first end, generally indicated at 22, which extends from the bore 18 of the fitting 14 and a second end, generally indicated at 24, which is adapted for attachment to a component to be controlled, such as a vent, heater, or the like, in an automobile. The end 24 of the core element 20 is formed into a plurality of loops or coils, frequently referred to as a "pigtail." The end 22 of the core element 20 also includes a deformed portion taking the form of one or more loops or "pigtails." It should be understood, however, that the end 22 of the core element 20 may be deformed into various shapes other than the loops disclosed.

A terminal means, generally indicated at 26, is made of plastic or an organic polymeric material and is disposed about the core element 20 and is in mechanical interlocking engagement with the deformed end 22 of the core element and is slidably supported in the bore 18 of the fitting 14.

The terminal means 26 includes an elongated section 28 and a knob section 30. The elongated section 28 in the embodiment of FIGURE 6 is preferably flexible yet provides sufficient strength for the wire-like core element 20 to prevent the core element from being permanently bent.

Figure 7:
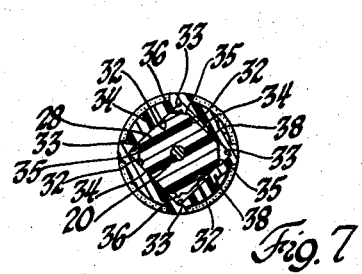
FIGURE 7 is an enlarged cross-sectional view taken substantially along line 7–7 of FIGURE 6.

The fitting 14 is preferably made of a plastic or an organic polymeric material and the bore 18 of the fitting 14 is polygonal in cross section, as illustrated in FIGURE 7, and includes a plurality of sides 32 which intersect one another at a plurality of corners 33. The elongated section 28 includes a plurality of surfaces 34, each of which slidably engages one of the sides 32 of the bore 18. The segments 35 join the surfaces 34 of the elongated section 28 and the segments 35 are spaced from the corners 33 of the bore 18. As will become more clear hereinafter, the elongated section 28 is formed in a mold having mating components with a cavity therein and the components mate one another along two of the segments 35 such that any material flowing between the components of the mold forms flashes 36 on two of the segments 35; hence, the flashes 36 do not interfere with the movement of the elongated section 28 in the bore 18 due to the spaced relationship of segments 35 with the corners 33.

The fitting 14 includes means comprising the membranes 38 projecting into the bore 18 to frictionally engage two of the surfaces 34 of the elongated section 28 for preventing movement of the terminal means 26 until a predetermined force is applied thereto. In other words, the membranes 38 project into the bore 18 to engage two sides 34 of the elongated section 28 to control the amount of force necessary to move the core element by grasping the knob 30.

Figures 8, 9:
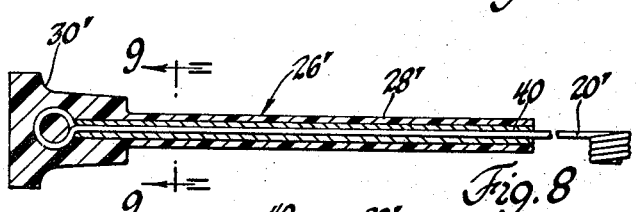
FIGURE 8 is a cross-sectional side view of another preferred embodiment of the motion-transmitting core element utilized in the remote control assembly of the instant invention.
FIGURE 9 is an enlarged cross-sectional view partially broken away and taken substantially along line 9—9 of FIGURE 8.

FIGURES 8 and 9 disclose an alternative embodiment wherein the terminal means 26' is disposed about a rigid tubular-like member 40 which is in turn disposed about the core element 20' so that the terminal means 26' is rendered substantially inflexible yet provides an elongated section 28' having an outer surface of organic polymeric material for frictionally engaging the bore 18 in the fitting to provide the desired frictional characteristics which are not attainable in the prior art devices which utilize a metal bar.

In the embodiments illustrated in FIGURES 6 through 9, the terminal means 26 is an integral member made of organic polymeric material; however, in some environments it is desirable that the elongated section 28 be formed independently of the knob section 30. For example, it is often desirable that the elongated section be made of an organic polymeric material which is flexible while the knob section be made of an organic polymeric material which is substantially inflexible. Additionally, it is often desirable to use an organic polymeric material to form the knob section which is suitable for plating or other treatment and to use an organic polymeric material for the elongated section which is flexible and which possesses inherent lubricative properties for sliding engagement with the bore 18 of the fitting 14.

Figure 1:
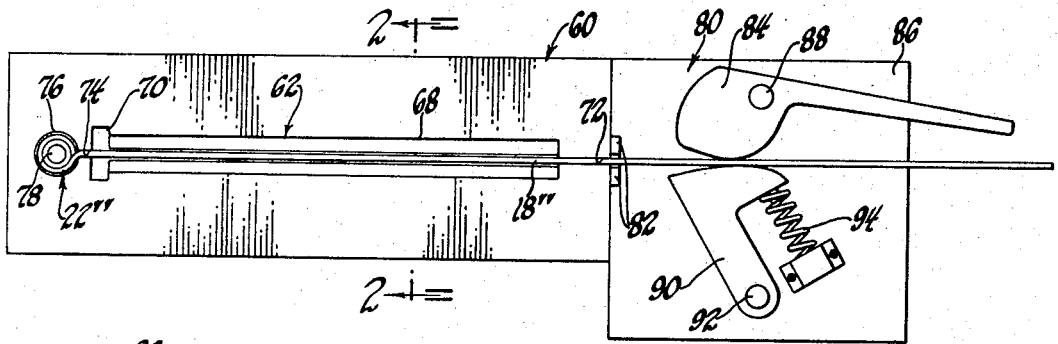
FIGURE 1 is a plan view of a molding apparatus which may be utilized to manufacture the remote control assembly of the instant invention.
Figure 3:
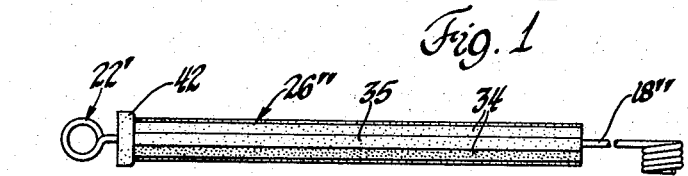
FIGURE 3 is a plan view of a motion-transmitting core element manufactured by the apparatus disclosed in FIGURE 1.
Figure 4:
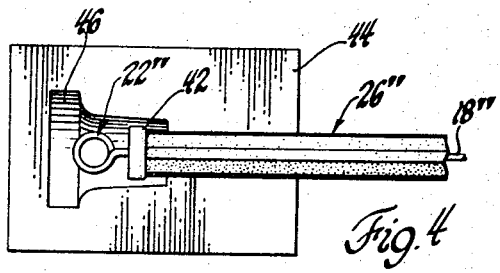
FIGURE 4 is a plan view showing the motion-transmitting core element of FIGURE 3 in position for a subsequent manufacturing step to produce the motion-transmitting core element utilized in the remote control assembly of the instant invention.

FIGURE 1 discloses an apparatus which may be utilized in manufacturing one preferred embodiment of the remote control assembly of the instant invention, which apparatus will be more fully described hereinafter, and FIGURE 3 discloses a wire-like core element 18'' with an elongated section 26'' of organic polymeric material formed in the apparatus disclosed in FIGURE 1. The elongated section 26' includes the surfaces 34 with the segments 35 joining the adjacent surfaces 34. The core element 18'' also has a deformed end shown generally at 22'' and which takes the form of at least one loop. The elongated section 26' includes a laterally projecting portion 42 which is formed in the apparatus of FIGURE 1. FIGURE 4 shows the core element 18'' with the hardened organic polymeric elongated section 26 in a cavity 46 in a mold 44 so that the deformed portion 22'' of the core element 18'' and the laterally extending portion 42 are disposed in the cavity 46. Organic polymeric material is injected into the cavity 46 and allowed to harden whereby it forms a knob section in mechanical interlocking engagement with the deformed portion 22'' and in mechanical interlocking relationship with the laterally projecting portion 42 of the elongated section 26. The knob section formed in the cavity 46 may be made of various different organic polymeric materials and need not be made of an organic polymeric material which is compatible for bonding to the organic polymeric material of the elongated section 26''.

Figure 5:
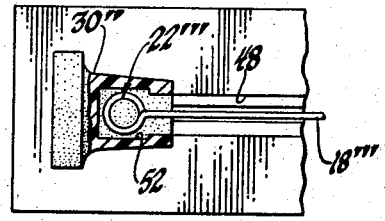
FIGURE 5 is a plan view of an apparatus for performing an alternate step in manufacturing a motion-transmitting core element utilized in the remote control assembly of the instant invention.

FIGURE 5 illustrates another form of the invention wherein a previously formed knob section 30'' is placed in an enlarged portion of the cavity 48 in a mold 50 and a core element 18''' is disposed in the cavity with the deformed portion 22''' extending into a pocket 52 in the knob section 30''. The deformed portion 22''' may engage the extremities of the pocket 52 to center the core element 18'''. Organic polymeric material is injected into the cavity 48 to flow about the core element 18''' and about the deformed portion thereof 22''' to harden into mechanical interlocking engagement with the deformed portion 22''' of the core element 18''' and into mechanical interlocking engagement with the pocket 52 of the knob section 30‴. Thus, in the embodiment of the invention illustrated in FIGURE 5, the elongated section is in mechanical interlocking engagement with the deformed portion 22‴ of the core element 18‴, and various organic polymeric materials may be utilized to preform knobs 30″ so that when organic polymeric interlocking engage-elongated section is in mechanical interlocking engagement with the knob section and the knob section and the elongated section may be made of various combinations of different organic polymeric materials.

In all the embodiments described, the knob section is in mechanical interlocking engagement with the deformed portion of the core element; to wit, the knob section may be formed directly about the deformed portion of the core element or the knob section may be in mechanical interlocking engagement with the elongated section which is in turn in mechanical interlocking engagement with the deformed section of the core element. Such an arrangement provides an assembly in which the force necessary to pull the knob section from the assembly is greatly increased over the force necessary to pull the knob section from the core element in prior art devices. For example, it was found that a knob secured to the end of a metal bar of the type utilized in prior art assemblies can be removed by applying a force of approximately fifty pounds thereto, yet a knob section constructed and secured to the core element in accordance with the instant invention could not be removed with less than a force of two-hundred fifty pounds.

FIGURE 1 discloses an apparatus for manufacturing a motion-transmitting core element of the type utilized in the instant invention and includes a mold, generally indicated at 60. The mold has a cavity, generally indicated at 62, for receiving a motion-transmitting core element 18″. The mold 60 has two mating components 64 and 66, component 64 not being shown in FIGURE 1. The cavity 62 includes an elongated portion 68 and an enlarged portion 70. The elongated portion 68 forms the elongated section 28 and the enlarged portion 70 forms the laterally projecting portion 42. The mold includes a first bore 72 which extends from the elongated portion 68 to the exterior of the mold for tightly engaging a portion of the core element 18″ so that only a portion of the length of the core element 18″ is disposed in the cavity 62. The mold also includes a second bore 74 which extends from the enlarged portion 70 in the cavity for receiving and tightly engaging a portion of the core element 18″ so that the core element 18″ extends through the cavity 62. The mold 60 includes a recessed portion 76 adjacent the bore 74 to receive the deformed loop portion 22″ of the core element 18‴. A securing means comprising the pin 78 is disposed in the recess for extending through and engaging the lop 22″ of the core element to coact with the tensioning means, generally shown at 80. The core element 18″ is placed in the cavity 62 so as to be centrally disposed therein and in spaced relation to the extremities of the cavity and extends through the bore 72 out of the mold 60 between the aligning fingers 82 and into the tension means 80. The tension means 80 includes a lever member 84 pivotally connected to a plate 86 by the pin 88 and a coacting member 90 pivotally connected by the pin 92 to the plate 86. The member 90 is biased in a counterclockwise direction by the spring 94. The core element 18″ is placed between the members 84 and 90 such that upon clockwise movement of the lever member 84 the member 90 pivots therewith against the action of the spring 94 to urge the core element 18″ away from the pin 78, thus placing the core element 18″ in tension. When the core element 18″ is placed in tension, it is maintained substantially centered in the cavity 62 as organic polymeric material is injected into the cavity 62 through the passage 96.

Figure 2:
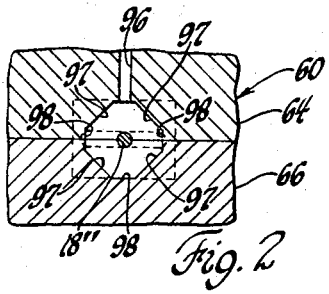
FIGURE 2 is a cross-sectional view taken substantially along line 2—2 of FIGURE 1.

As best illustrated in FIGURE 2, the cavity 62 is shaped to form the elongated section 28, as shown in FIGURES 6 and 7. More specifically, the elongated portion 68 of the cavity 62 has a plurality of surfaces 97 extending therealong and angularly disposed relative to one another. The surfaces are joined by segments 98 which extend along the cavity 62 and each of which is angularly related to the surfaces 97 which they join. The two mating components 64 and 66 of the mold engage one another along two of the segments 98. More specifically, the cavity includes first and second pairs of surfaces 97, and each pair is parallel to one another and perpendicular to the other pair so that planes containing the surfaces 97 form a square. The components 64 and 66 of the mold 60 engage one another along two of the segments 98, each of which joins a pair of the surfaces 97 so that the organic polymeric material injected into the cavity 62 which flows between the components 64 and 66 to form a flash along the segments 98 is disposed within the angle formed by and out of alignment with the planes of the pair of surfaces 97 adjacent thereto. That is to say, such a flash is shown in FIGURE 7 at 36, and it will be evident that the flash is disposed within the angle formed by the planes of the adjacent surfaces 34 and that the flashes are not in alignment with either of the planes of the adjacent surfaces 34 so that the planes of the surfaces 34 do not intersect the flashes 36. In molding items in sectional molds, it is almost impossible to prevent such flash by the materials seeping between the interfaces of the mold sections. In the instant environment, however, such flashes might cause a problem in that the flashes might interfere with the movement of the elongated section 28 in the bore 18 of the fitting 14. However, by forming the elongated section 28 as disclosed, the flashes do not engage the bore 18 of the fitting 14 and thus do not interfere with the movement of the core element in the conduit 16 in the fitting 18.

As alluded to previously, the apparatus for manufacturing the motion-transmitting core element in accordance with the instant invention may also take the form of the mold 50 illustrated in FIGURE 5 wherein the enlarged portion of the cavity 48 is formed to receive the knob section 30″. The knob section 30″ has a pocket 52 therein so that the core element 18‴ may be disposed in the cavity 48 with the deformed portion or loop 22‴ disposed in the pocket 52 whereby organic polymeric material injected into the cavity 50 flows about the core element 18‴ and into the pocket 52 and about the deformed loop portion 22‴ and hardens into mechanical interlocking engagement with the knob 30″ and the core element 18‴.

As described previously, the terminal means 26 may be a unitary member or may be formed by a knob section and an elongated section; thus, various organic polymeric materials or various combinations of organic polymeric materials may be utilized to make the terminal means 26. Among the organic polymeric materials which may be utilized are the following: Delrin, Cycolac, acetal resin, polyethylene, polypropylene and nylon.

The invention has been described in an illustrative manner and it is to be understood that the terminology used is intended to be in the nature of words of description rather than of limitation.

The embodiments of the invention in which an exclusive property or privilege is claimed are defined as follows:

1. A motion transmitting remote control assembly comprising: a guide including an end fitting having a bore therethrough, a motion transmitting core element movably supported within said guide with a first end thereof extending from said bore in said fitting and a second end thereof adapted for attachment to a component to be controlled, said core element having a deformed portion adjacent said first end thereof, and terminal means of organic polymeric material disposed about said core element and in mechanical interlocking engagement with said deformed portion of said core element, said terminal means including an enlarged actuatable section and an elongated section extending therefrom and movably supported in said bore in said end fitting, said core element extending through said elongated section and terminating in said deformed portion, one of said enlarged section and said elongated section being contiguous with and surrounding said deformed portion of said core element, said elongated section being flexible for bending thereby to bend along the length thereof so that said enlarged section may move laterally relative to said fitting.

2. A motion-transmitting remote control assembly as set forth in claim 1 wherein said fitting is of an organic polymeric material and said bore therein is polygonal in cross section with a plurality of sides intersecting at a plurality of corners, said terminal means having a plurality of surfaces joined by a plurality of segments, each of said surfaces being in sliding engagement with one of said sides of said bore and said segments joining said surfaces being spaced from said corners of said bore.

3. A motion-transmitting remote control assembly as set forth in claim 2 wherein said fitting includes means projecting into said bore to frictionally engage at least one of said surfaces on said terminal means for preventing movement thereof until a predetermined force is applied thereto.

4. A motion transmitting remote control assembly as set forth in claim 1 wherein said core element is a wire-like member.

5. A motion transmitting remote control assembly as set forth in claim 4 wherein said deformed portion is defined by at least one loop in which said core element terminates.

6. A motion transmitting remote control assembly as set forth in claim 4 wherein said enlarged section defines a knob section, said elongated section and said knob section being independently formed and said elongated section is in mechanical interlocking engagement with said knob section.

7. A motion-transmitting remote control assembly as set forth in claim 6 wherein said elongated section includes a laterally projecting portion which is in said mechanical interlocking engagement with said knob section.

8. A motion-transmitting remote control assembly as set forth in claim 6 wherein said knob section is in said mechanical interlocking engagement with said deformed portion of said core element.

9. A motion-transmitting remote control assembly as set forth in claim 6 wherein said elongated section is in said mechanical interlocking engagement with said deformed portion of said core element.

10. A motion-transmitting remote control assembly as set forth in claim 6 wherein said knob section is made of an organic polymeric material which is incompatible for bonding to the organic polymeric material of said elongated section.

11. A motion-transmitting remote control assembly as set forth in claim 6 wherein said fitting is of an organic polymeric material and said bore therein is polygonal in cross section with a plurality of sides intersecting at a plurality of corners, said elongated section having a plurality of surfaces, each of which slidably engages one of said sides of said bore with segments joining said surfaces and being spaced from said corners of said bore whereby said elongated section may be formed about said core element in a mold having sections which meet along said segments and the flashes of material on said segments resulting from material flowing between the sections of the mold will not engage the bore in said fitting.

12. A motion-transmitting remote control assembly as set forth in claim 11 wherein said fitting includes means projecting into said bore to frictionally engage at least one of said surfaces on said elongated section for preventing movement thereof until a predetermined force is applied thereto.

13. A motion-transmitting remote control assembly as set forth in claim 12 wherein said means projecting into said bore includes at least two membranes formed integrally with said fitting and projecting into said bore, said membranes frictionally engaging adjacent ones of said surfaces on said elongated section.

14. A motion-transmitting remote control assembly as set forth in claim 13 wherein said deformed portion forms at least one loop at said first end of said core element.

15. A motion-transmitting remote control assembly as set forth in claim 14 wherein said guide includes a flexible conduit disposed about said core element, said fitting being attached to one end of said conduit.

16. A motion-transmitting remote control assembly as set forth in claim 15 wherein said knob section is in said mechanical interlocking engagement with said deformed portion of said core element.

17. A motion-transmitting remote control assembly as set forth in claim 15 wherein said elongated section is in said mechanical interlocking engagement with said deformed portion of said core element.

References Cited
UNITED STATES PATENTS

| | | | |
|---|---|---|---|
| 1,837,220 | 12/1931 | Kai | 74—503 |
| 2,409,759 | 10/1946 | Hosking | 264—271 X |
| 2,871,719 | 2/1959 | Hooker | 74—503 |
| 3,190,084 | 6/1965 | Moon et al. | |
| 3,211,019 | 10/1965 | Roach et al. | 74—501 |
| 3,240,233 | 3/1966 | Johnston. | |
| 3,373,632 | 3/1968 | Jeromson et al. | 74—502 |

MILTON KAUFMAN, *Primary Examiner.*

U.S. Cl. X.R.

74—503; 264—271

UNITED STATES PATENT OFFICE
CERTIFICATE OF CORRECTION

Patent No. 3,416,389                                                             December 17, 1968

Winthrop B. Conrad et al.

It is certified that error appears in the above identified patent and that said Letters Patent are hereby corrected as shown below:

Column 5, line 6, after "polymeric" insert -- material hardens the --; same line 6, cancel "interlocking engage-"; line 53, "lop" should read -- loop --.

Signed and sealed this 17th day of March 1970.

(SEAL)
Attest:

Edward M. Fletcher, Jr.                                     WILLIAM E. SCHUYLER, JR.
Attesting Officer                                                     Commissioner of Patents